United States Patent [19]

Culver

[11] Patent Number: 4,982,618
[45] Date of Patent: Jan. 8, 1991

[54] MULTIFUNCTION TACTILE MANIPULATABLE CONTROL

[76] Inventor: Craig F. Culver, 201 Ware Rd., Woodside, Calif. 94086

[21] Appl. No.: 456,012

[22] Filed: Dec. 20, 1989

Related U.S. Application Data

[63] Continuation of Ser. No. 342,416, Apr. 24, 1989, Pat. No. 4,896,554, which is a continuation of Ser. No. 116,105, Nov. 3, 1987, Pat. No. 4,823,364.

[51] Int. Cl.⁵ .......................... G09G 9/02; G09G 1/00
[52] U.S. Cl. .............................. 74/471 XY; 273/148 B; 340/706; 340/710
[58] Field of Search ................. 74/471 R, 471 XY; 178/18; 340/706, 709, 710; 338/123, 132, 133; 273/148 B

[56] References Cited

U.S. PATENT DOCUMENTS

| | | | |
|---|---|---|---|
| 3,823,616 | 7/1974 | Houseman et al. | 74/471 R |
| 3,838,211 | 9/1974 | Joannou | 178/18 |
| 4,506,336 | 3/1985 | Hird | 340/727 |
| 4,624,537 | 11/1986 | Hanssen et al. | 340/709 X |
| 4,670,743 | 6/1987 | Zemke | 74/471 XY |
| 4,692,756 | 9/1987 | Clark | 74/471 XY |
| 4,712,101 | 12/1987 | Culver | 74/471 XY |
| 4,724,715 | 2/1988 | Culver | 74/471 XY |
| 4,799,049 | 1/1989 | Avila | 340/709 |

OTHER PUBLICATIONS

N. Leon "Thumbwheel Positional Control Unit" IBM Technical Disclosure Bulletin, vol. 21, No. 7, pp. 3024–3027, Dec. 1978.

*Primary Examiner*—Allan D. Herrmann
*Attorney, Agent, or Firm*—Skjerven, Morrill, MacPherson, Franklin & Friel

[57] ABSTRACT

A multifunction human digit control includes a rotating cylinder journalled in a movable bar slidable in a groove in a deflectable support track. Rotation of the cylinder by a thumb or finger generates a first motion signal and movement of either or both of the bar and the cylinder by tactile movement, generates a second motion signal, representing, for example, X-axis and Y-axis positions, respectively, of a cursor on a computer screen. Various types of motion detectors or encoders are disclosed to detect the various movements of the bar and cylinder. The mechanism also permits actuation of a switch or other motion detector in a Z-axis by deflection of any one of the bar, the cylinder or portions of the support track with respect to a support structure. In a preferred embodiment, the overall control has its digit-operated tactile surfaces exposed in an aperture contained in a device casing, such as an opening in a computer keyboard or in an instrument housing or control panel.

9 Claims, 6 Drawing Sheets

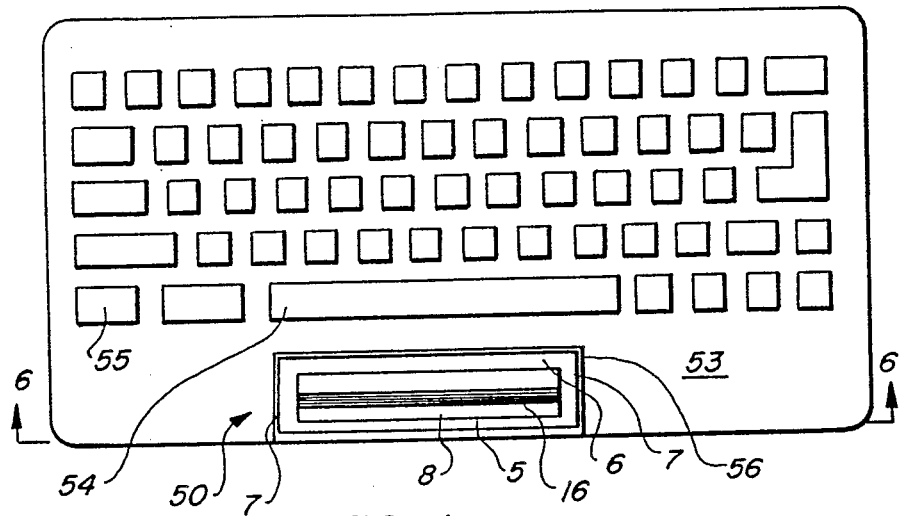
FIG._1.
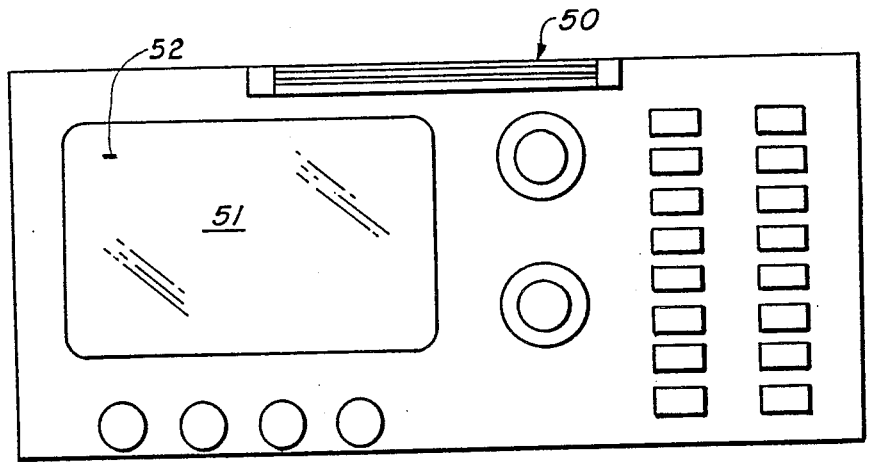
FIG._14.

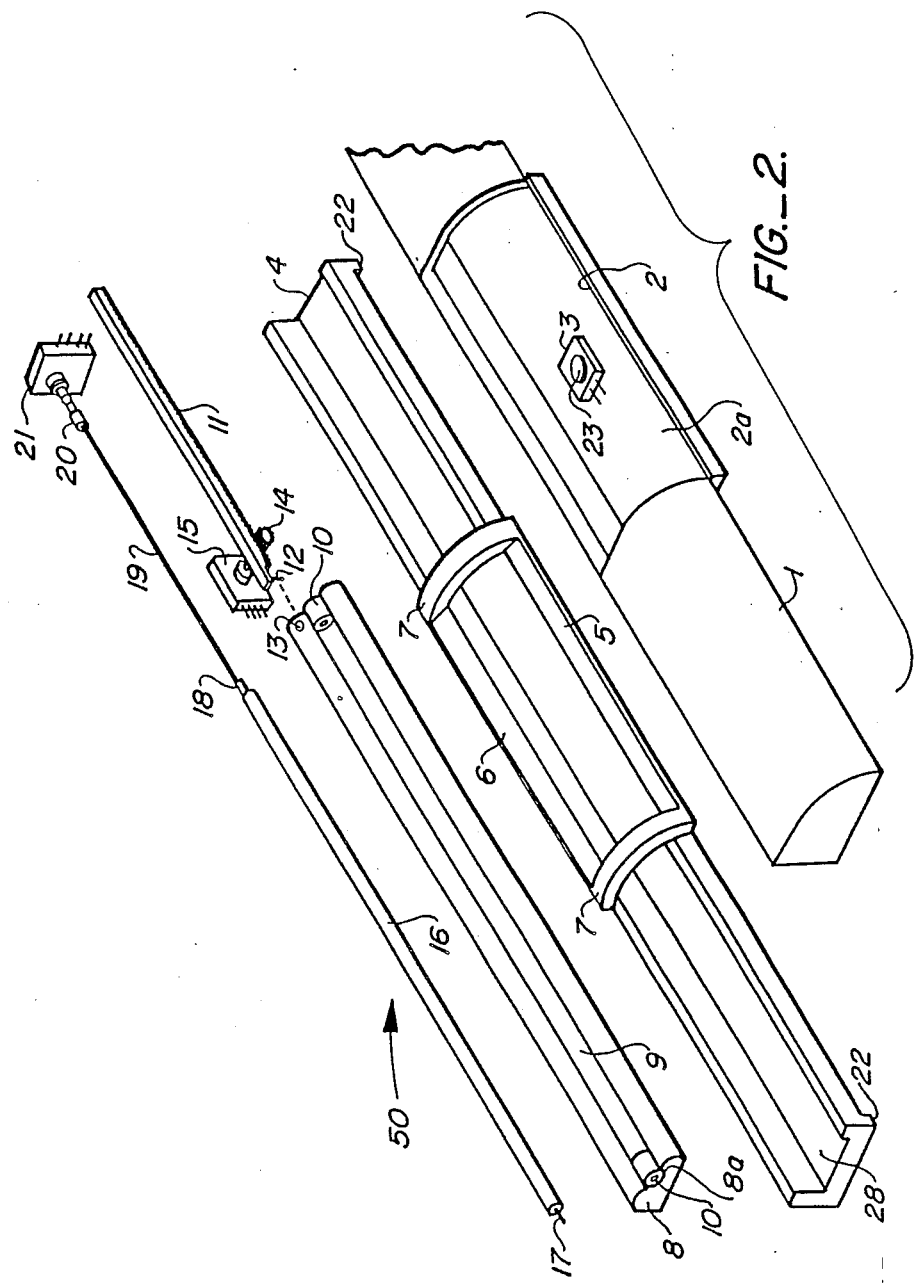

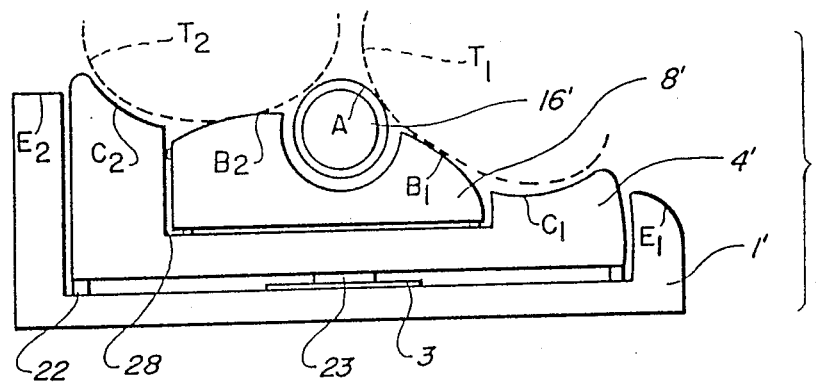
FIG._3.
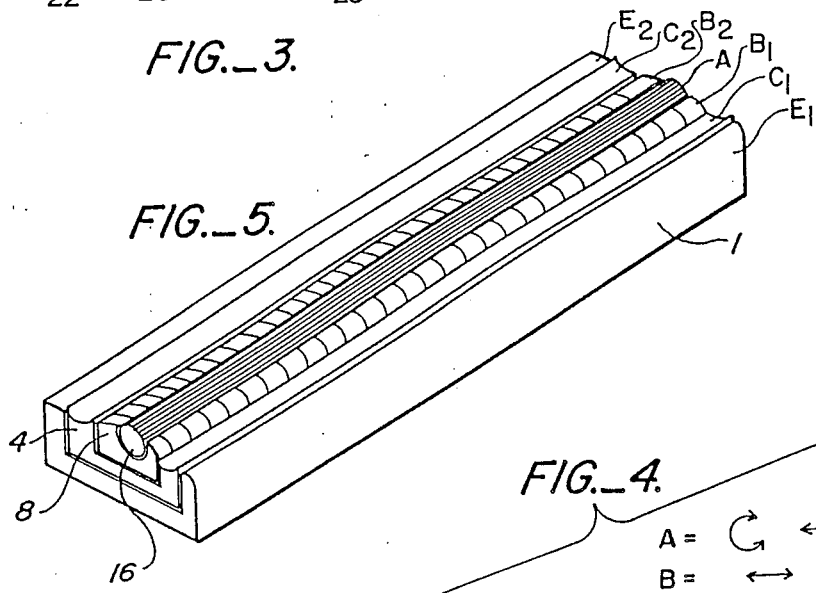
FIG._5.
FIG._4.
A = ↻ ↔ ↓
B = ↔ ↓
C,D = ↓
E = 0
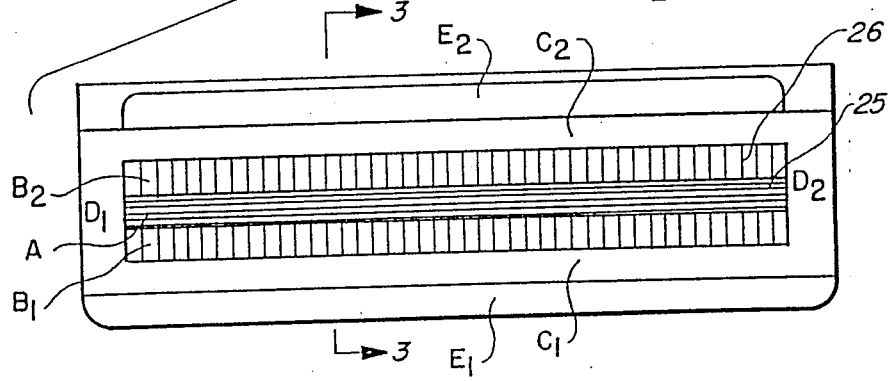

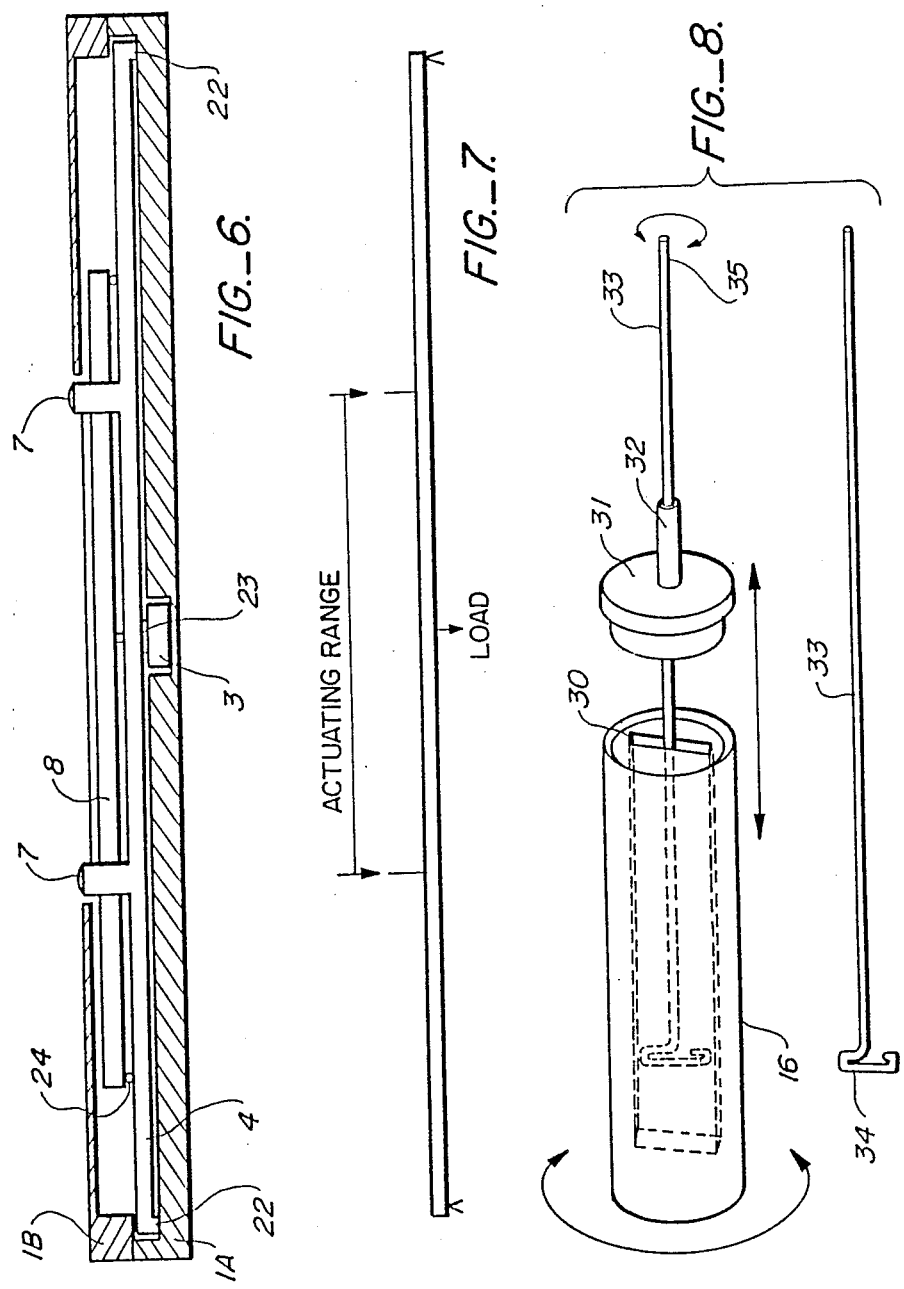

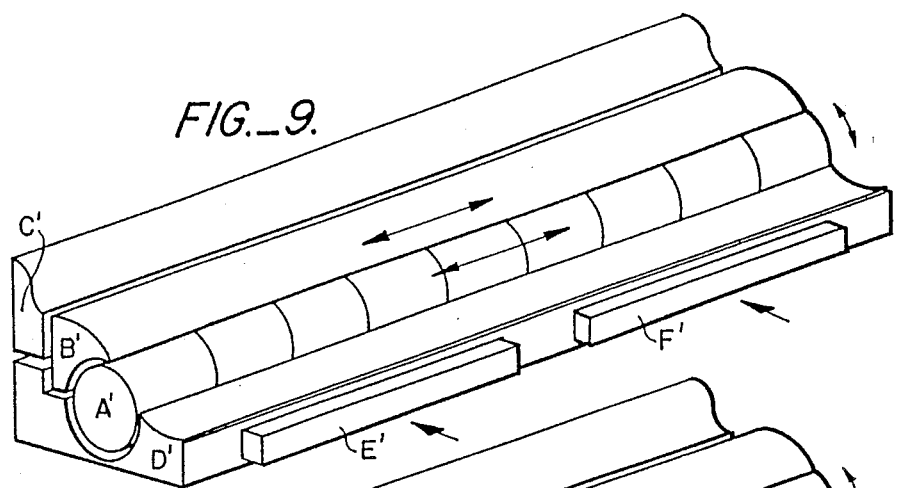
FIG._9.
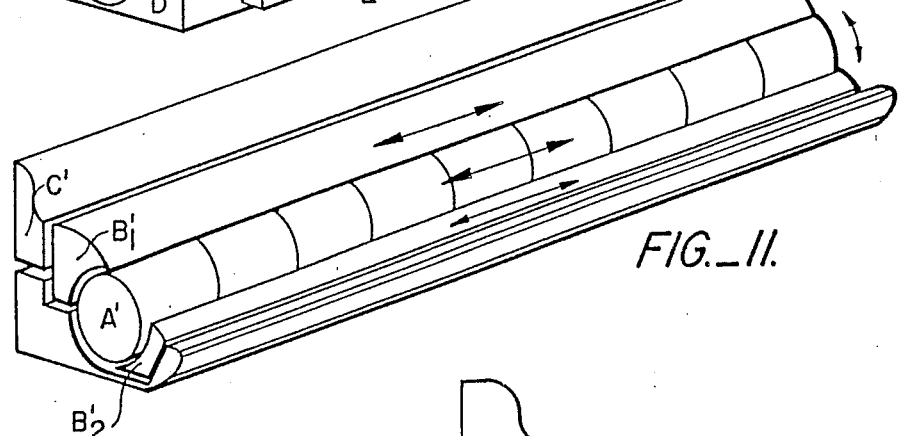
FIG._11.
FIG._12.
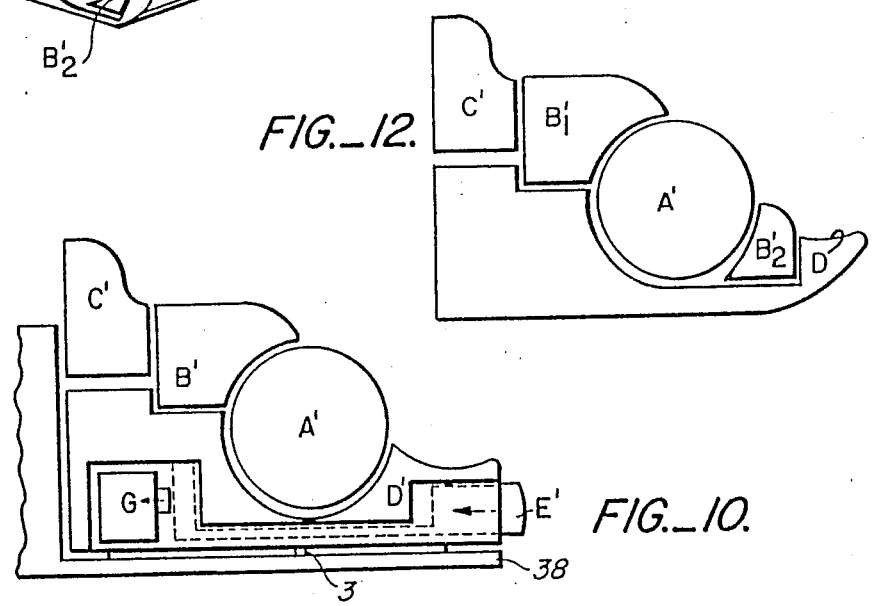
FIG._10.

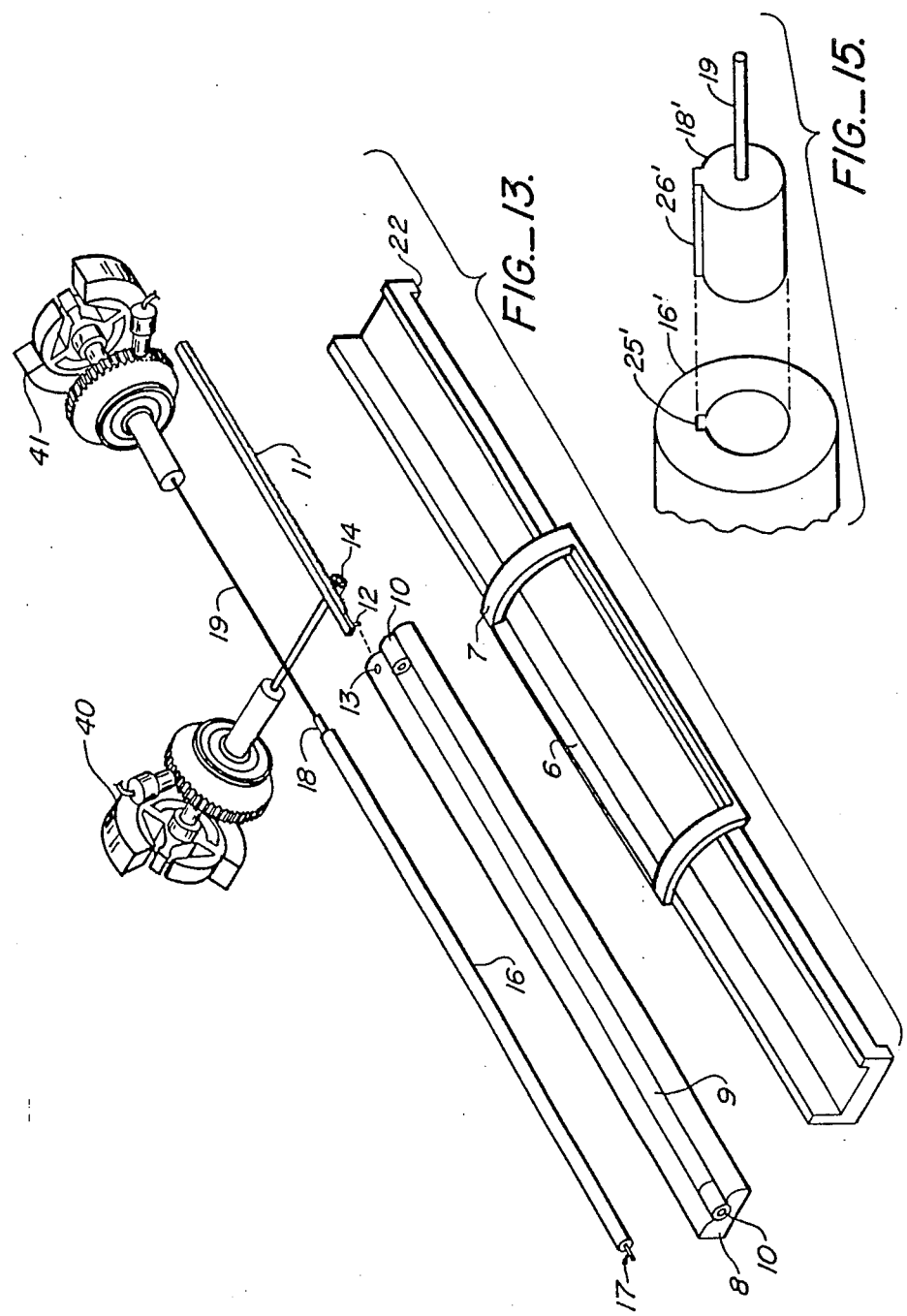

MULTIFUNCTION TACTILE MANIPULATABLE CONTROL

This application is a continuation application Ser. No. 07/342,416, filed Apr. 24, 1989 now U.S. Pat. No. 4,896,554 which was a continuation of application Ser. No. 07/116,105, filed Dec. 3, 1987 now U.S. Pat. No. 4,823,364.

This invention relates to a tactile control for instruments or machines to be controlled by signal variations adjusted by manual manipulation.

RELATED APPLICATIONS

This application is related to U.S. application Ser. Nos. 06/857,886, filed Apr. 30, 1986, Craig F. Culver, inventor, now U.S. Pat. No. 4,724,715, entitled "Control Mechanism for Computer Keyboard and the Like"; and Ser. No. 06/677,703, filed Dec. 4, 1984, Craig F. Culver, inventor, now U.S. Pat. No. 4,712,101, entitled "Control Mechanism for an Electronic Apparatus".

BACKGROUND OF THE INVENTION

As set forth in the above related applications and as otherwise well known, a hand-manipulatable trackball, touch tablet, mouse, or joystick has been used with a computer keyboard for moving a cursor on a CRT display. Likewise, it is known to have a control mechanism, including a rotatable shaft and a freely slidable sleeve member on the shaft to separately move linearly with respect to the shaft and move rotatively with the shaft. First and second analog valves, representing X and Y axis coordinates, for example, can be adjusted in mechanically actuated transducers such as potentiometers or other encoders by rotation of the shaft and linear movement of the member, respectively. Such mechanisms have been placed proximate to the keyboard so that a user's hand can be moved to effectuate the above movements and signal generation. Mechanisms of this type have also been constructed so that slight downward pressure on the shaft or sleeve member will actuate an electrical switch for enabling a circuit in the apparatus being controlled.

While the control mechanism described above is suitable for a number of applications, such a mechanism can be simplified so that a control mechanism can be constructed with fewer moving parts yet the simplified control mechanism can provide precision control of a pair of analog values, such as the X-Y position of the cursor of a computer display. The present invention provides such a simplified mechanism.

In the preferred construction of the related first application, the shaft on which the cylinder travels must have a precision shaft surface which is exposed to permit full travel of the cylinder, thus exposing the working mechanism and bearings to contamination. Further, the shaft bearing surface is also used as an operator contact surface with conflicting requirements for surface texture in the latter and smooth bushing surface in the former, along with generally nonoptimized ergonomics and appearance. The position of the cylinder on the shaft, in use, is constantly changing, depriving the user of a fixed reference and causing disorientation, i.e. the user can lower his thumb to the point where he thought the cylinder was residing but finds it is no longer there. Also in the prior devices, in pure horizontal movement, one side of the finger rests against the cylinder and the other rests and drags across a fixed edge of the housing to provide a ruler-like steady fixed reference. This friction degrades operation and contributes to a noticeable amount of vertical drift in the horizontal movement.

The prior art devices now in use (trackballs, mice, joysticks, etc.) have not been ergonomically designed to permit optimum positioning within a control panel or keyboard nor have they been designed for efficient thumb operation, the thumb being a digit of the hand with great dexterity. Because of their size or the nature of their operation, these devices do not lend themselves to symmetrical centering between the home hand positions for ambidextrous accessibility.

SUMMARY OF THE INVENTION

In one application, the present invention replaces a conventional trackball or desktop mouse for use as a pointer-selector and switch device for use with a computer, workstation, or terminal and its software. It is also useful with other apparatus including audio and video equipment, hand-held remote control devices, and vehicular control. In a computer keyboard application, control is placed under the user's thumbs so that pointing and selecting or other control functions can be accomplished without removing the fingers from the home keys on the keyboard. Instead of moving the whole hand and arm away from the keyboard to a conventional trackball or other separate control mechanism and back, the user can perform pointing or selecting or other control functions with a mere few thumbstrokes. The invention in a typical embodiment is positioned in an aperture in the center of the keyboard juxtaposed to and in front of the space bar to provide intuitive, ambidextrous, and efficient trackball pointing and selecting and other control functions, including efficient switch functions.

The problem of the changing position of the cylinder is eliminated. The cylinder surface always appears at the same central point in the device, surrounded by the aperture, which itself "frames" the cylinder and serves as a fixed reference, both spatial and tactile.

An important improvement is the addition of a linearly traveling horizontal bar into which the cylinder is journalled so that the cylinder and bar travels in tandem from end to end. The bar slides or rolls upon supports and contributes little or no drag to the movement of the cylinder.

The top surface of the bar may be flat or it may be convexly contoured to complement the naturally round shape of the cylinder surface. The significance of this shape is the formation of a groove between the bar and the cylinder. This groove serves several purposes. It forms a tactile indicator to the user for position. It is a natural nesting point and the home position for the user's thumbs. By feeling for the groove, the user is provided a quick, repeatable, and positive positional reference. The co-location of a convex bar and cylinder provide a moving horizontal reference, of great use in the execution of purely horizontal movement commands. To generate such a command with this device, the user rests his thumb in the groove between the two members, and then exerts sideways movement in the desired direction. The frictional contact of the thumb with the two members locks them together, resisting rotation of the cylinder. The bar, being free to move horizontally, moves in the desired direction. The resulting movement is purely horizontal; the frictional locking of the cylinder by the thumb prevents the inadvertent introduction of any unwanted vertical movement which would be caused by rotation of the cylinder.

The creation of the groove between the two members, and the assignment of that groove as the "home" surface for the user's thumbs, permits the user to instantly alter the direction of desired movement at will, this direction being determined only by the direction of travel of the thumb itself. Pure horizontal movement of the thumb on the groove, as above, will result in the generation of a pure horizontal control signal. Pure downward movement of the thumb will cause the cylinder to rotate, generating a corresponding downward vertical command. An upward vertical command is generated by placing the thumb against the cylinder and rotating it upward.

The juxtaposition of the two members enhances the operator's ability to use both thumbs in concert to generate movement commands. As an example, the left thumb might rest in the groove between the members and primarily control horizontal movement. The right thumb might then rest against the cylinder and primarily control vertical movement. The user controls the drag by adjusting the amount of friction between his thumb and the various components. In extensive use of the device, this combined operation has proven to be perhaps the most common mode of using the device on a keyboard.

The present invention continues the original concept in the related applications of permitting primary switch closure by means of downward pressure on the cylinder itself, but it expands the accessibility of this function in several ways. Downward pressure on the moving bar will also close the primary switch. Thus, holding the switch closed while generating a horizontal command is facilitated by exerting downward thumb pressure on the moving bar or the groove between bar and cylinder, while moving the thumb sideways. This is sometimes referred to as "dragging." In one embodiment, a horizontally fixed bar has been added to the unit directly in front of, parallel to, and above and below the sliding bar. This bar has two functions: a fixed parallel reference next to the bottom front of the cylinder, and a switch surface. Downward thumb or finger pressure against this bar closes a switch, and permits such closure in isolation from the X-Y movements of the adjacent cylinder. Thus, by pressing on this bar, the user may close a switch without risk of causing inadvertent X or Y movement of the control (creep). By operating this fixed switch bar with one thumb, the user may devote the other thumb to X-Y movements. In this way, "dragging" the controlled cursor on a computer screen can be achieved with increased accuracy because the axis-controlling thumb is not "loaded" or burdened with the need to hold the switch closed.

The home point for thumb or finger, formed by the groove between the cylinder and the moving bar, may be further enhanced by proper contouring of the adjacent switchbar surface. The preferred shape is a concave one, which tends to "cup" around the curve of the bottom of the thumb when the thumb is moving the cylinder. This concave surface, when combined with the convex surfaces of the cylinder and the moving bar, provide a unified multifunction control surface in which there is clear tactile distinction between functions. The concave surface permits the user to drag his thumb along the concavity while contacting the cylinder, or to push against the front edge of the switchbar without touching the cylinder at all. In other words, the shape and positioning of the switchbar permit the user to instantly choose between combined or isolated operation.

This addition completes the most important improvement of the invention over the previous devices. It creates a virtually single contact and control surface composed of three distinct active parts, each with a separate but related function. The thumb or fingertip may rest in a suitably contoured groove and simultaneously contact all three control surfaces. Each surface serves as a frictional and tactile reference for the adjacent surface; by means of subtle shifts in finger pressure and direction, any one surface may be operated separately, or any two adjacent surfaces may be operated in combination, or all three surfaces may be operated together. This arrangement creates a new form of control surface, in which the relationship of the various parts to the controlling finger dynamically changes as the device is operated. Unlike any other control, several values may be adjusted in perfect isolation, or in combination, always permitting instantaneous shifting from one mode to the other. Because the fingertip is in simultaneous contact with all active control surfaces, it does not need to shift position from one control surface to another, as in conventional multifunction controls. Instead, the shift is solely in direction of pressure and movement.

In practice, the added switchbar is generally in the form of a rectangular frame which surrounds the exposed cylinder/bar contact aperture, and forms the outer periphery of the control aperture, the left and right sides being supported over the cylinder and bar to permit their free movement. This arrangement permits the switch to be closed in any of several ways, namely, pressure on the cylinder; pressure on the horizontal moving bar; pressure on the virtual groove between these two members; pressure on the fixed switch bar along the front or the rear of the aperture; and pressure on either end section of the switchbar. These options give the individual user broad freedom in his choice of how he will operate the switch and to what degree he will integrate axis control with switch control.

The above functions and features result from the use in a support structure such as a computer keyboard or instrument control panel housing frame of a support track having an elongated recess, an elongated moving bar with a thumb movable surface, the bar being in and longitudinally moveable in the track recess. A linearly and rotatively movable cylinder is journalled in and juxtaposed to the moving bar for isolated rotary or combined rotary and linear movement. Provided are means operable by linear movement of the bar to the cylinder for producing a motion signal for accessing a first motion detector and means operable by rotation of the cylinder independent of the bar for producing a motion for accessing a second motion detector. The various functional parts to be accessed by the user are preferably contained in an access aperture in which the operable parts are rested for single or combined contact and movement in multiple functional relationships.

BRIEF DESCRIPTION OF DRAWINGS

FIG. 1 is a plan view of the control integrated into a computer keyboard.

FIG. 2 is an exploded simplified view of the preferred embodiment of the invention.

FIG. 3 is a sectional view of a second embodiment of the control, taken on line 3—3 of FIG. 4.

FIG. 4 is a plan view of the second embodiment.

FIG. 5 is a perspective view of the second embodiment.

FIG. 6 is a sectional view of the preferred embodiment taken on line 6—6 of FIG. 1.

FIG. 7 is a schematic side view of the load and support points of the support track of the preferred embodiment.

FIG. 8 is a perspective exploded view of the cylinder/drive shaft/encoder connection.

FIG. 9 is a perspective view of a third embodiment of the invention incorporating auxiliary switches.

FIG. 10 is an end view of the construction of FIG. 9.

FIG. 11 is a perspective view of a fourth embodiment of the invention.

FIG. 12 is an end view of FIG. 11. FIG. 13 is an exploded partial view of the preferred embodiment of the invention showing the addition of a feedback response capability.

FIG. 14 is a front view of an oscilloscope incorporating the control of the invention.

FIG. 15 is a perspective exploded partial view of a second embodiment of a cylinder/shaft connection.

DETAILED DESCRIPTION

The multifunction control of this invention for use with computer keyboards and other instruments incorporates a rotating cylinder fo generation of a motion signal. The rotating cylinder itself is journalled in a longitudinally traveling hoizontal member or sliding bar, which itself is part of the control surfaces and which generates a second motion signal. The motion signals normally will represent X-axis and Y-axis orthogonal positions. The sliding bar has top surfaces curved for optimal finger/thumb or other digit contact and the bar is slidable in an elongated fixed support track. The track also serves as a lever arm to transfer pressure downwardly in a Z-direction to operate a Z-axis switch or other motion detector.

In FIG. 1, a contactable topside portion of the overall control 50 is seen exposed in an aperture 56 positioned across a middle third of a computer keyboard frame 53 in front of a standard space bar 54. The exposed parts of the control include a surrounding connected rear switchbar 6, a front switchbar 5, and side switchbars 7. Other keyboard keys 55 are provided above and to the sides of the space bar as known in the computer art. Within the "frame" formed by the connected switchbars are seen slidable bar 8 extending thereacross and a rotary cylinder 16 journalled in the bar. It can be seen in FIG. 1 that the hands of the user in normal input "home" position for the striking of keys is such as to allow primarily the thumbs of the user to not only press the space bar 54 but also to manipulate either or both the rotary cylinder and the sliding bar to generate an X-axis and Y-axis, signal to suitable motion detectors. At any time, the user may press down on any part of the switchbars or any exposed part of the cylinder or sliding bar to produce due to a deflectable track in which the bar slides, a Z-axis motion, and resultant actuation of a pressure-or other motion-sensitive switch or control.

The principal parts of the control 50 are shown in FIG. 2. A rigid control housing or base 1, which may be part of the computer or other instrument housing 53 or a separate housing attached or offset from the computer or other instrument, contains an operational aperture 2. The interior floor 2a of the housing contains a Z-axis snap-action, single throw switch 3 with a switch actuator 23 extending upwardly therefrom. The housing 1 is normally constructed of plastic material and is made in two parts so that the other components may be installed within the housing. A generally U-shaped support track 4 is installed inside the housing such that track legs 22 rest adjacent opposite ends of the housing floor. The center of the support track rests on or slightly above the Z-axis switch actuator 23. The support track has sufficient flexibility so that downward finger pressure on any of the central parts 5, 6, 7 or bar 8 or cylinder 16 deflects the center of the track downward against the operator 23, and closing the Z-axis switch.

The sliding movable bar 8 is inserted into a recess or groove 28 in the support track. The bar is free to slide longitudinally on low-friction bearing supports (not shown). These supports slide on a smooth top surface of the recess in the support track. The side switchbars 7 extend over the top of the sliding bar and do not interfere with bar movement. The sliding bar includes a groove 9 running from one end to the other. At each end is mounted a removable fixed bushing 10. The cylinder 16 is a hollow tube carried in the two bushings by a left shaft 17 and a right shaft 18. The cylinder 16 fits in the groove 9 without contacting the groove sides, and is free to rotate in the bushings and groove. A vertical drive shaft 19 passes through the hollow right shaft 18. The inside of the cylinder as seen in FIG. 15 is non-round with a keyway 25 and slideably engages a spline 26 at the left end of the horizontal drive shaft 18. This arrangement permits the cylinder to transfer its rotation to the drive shaft, while remaining free to slide longitudinally without transferring longitudinal motion to the drive shaft. At the right end of the drive shaft is a shaft coupling 20 which connects the drive shaft to the shaft of a rotary encoder 21 or other rotary transducer which generates digital or proportional signals to control the computer display or to control another instrument. This arrangement transfers all rotational movement of the cylinder directly to the encoder.

Longitudinal movement of the sliding bar 8 or cylinder 16 is transferred to a transducer by a horizontal drive rack 11 linked to the right end of the sliding bar 8 by means of a pin 12 inserted into a hole 13 in the bar. The bottom surface of the drive rack is toothed, and engages a toothed pinion 14 which is mounted on the shaft of a horizontal motion encoder 15. This is a rotary encoder similar to encoder 21. The rack and pinion converts longitudinal movement of the sliding bar to rotation for detection by encoder 15. This encoder may be mounted at other points such as in the center of the assembly, so that the pinion directly engages a rack formed in the bottom of the sliding bar.

When the above components are assembled, the X-axis and X-axis cylinder and sliding bar control surfaces are exposed in the aperture surrounded by the digit-contactable surfaces of switchbars 5, 6, and 7.

Elimination of a support shaft shown in the first related application now U.S. Pat. No. 4,712,101 makes possible construction of cylinders down to ⅛ inch or less in diameter with high ergonomic efficiency.

FIG. 3 illustrates an end view of a control showing two alternate thumb positions T1, T2 in position overlying an exterior circular surface A of cylinder 16', convex surfaces $B_1$, $B_2$ of the sliding bar 8' and concave surfaces $C_1$, $C_2$ of the track 4'. Surfaces $E_1$, $E_2$ of the housing 1' may be curved and flat, respectively. The respective surfaces above are shown in plan and perspective views in FIGS. 4 and 5 showing longitudinal serrations 25 on cylinder surface A and transverse serrations 26 on surfaces $B_1$, $B_2$ to facilitate tactile feel and afford nonslip control. The graphical representation in FIG. 4 illustrates the movements of elements A, B, C, and D.

There are specialized applications in which a large diameter cylinder is desirable, but for normal thumb and fingertip operation, a relatively small diameter of from about 4 to 12 mm is preferred, because it brings the exposed surface of the cylinder, when combined with the other contact surfaces, into a correct proportional relationship with the dimensions of normal human fingertips and thumbs.

Mounting of the cylinder in the top center of the sliding bar, when combined with complementary shaping of the contact surfaces of the bar, creates a perpendicularly symmetrical control surface, in which the fingertips may contact either the front ($B_1$) or the rear ($B_2$) surface of the sliding bar simultaneously with cylinder contact. Continuing the symmetry, the two exposed contact surfaces of the support track, i.e. the switchbars ($C_1$ and $C_2$), which appear in front of and behind the sliding bar surfaces, permit the fingertips to contact one or the other of these surfaces simultaneously with cylinder and bar contact. Thus, in typical operation, the user's finger or thumb is in contact with all three active surfaces: the cylinder, the sliding bar, and the switchbar. This three-way contact may be achieved with the thumb in front of, or behind the cylinder. The two arrangements are mirror images of each other.

This contact with the three surfaces, each of which has a different function, is a key to the accuracy and stability of control provided by the device. Each surface in effect provides a reference for the adjacent surfaces:

a. When the user is rotating the cylinder for vertical movement, simultaneous sliding finger contact with the adjacent sliding bar surface adds stability to the resulting vertical movement.

b. When the user is sliding the bar for horizontal movement, simultaneous sliding finger contact with the switchbar surface adds stability to the resulting horizontal movement.

c. When the user desires pure horizontal movement by moving the sliding bar surface, simultaneous finger contact with the cylinder "locks" the cylinder, preventing inadvertent vertical "drift" or "creep".

d. When the user desires pure vertical movement by rotating the cylinder with one thumb, the other thumb may be placed against the sliding bar surface to "lock" it, preventing inadvertent horizontal drift.

e. When the user desires to deviate from a pure (isolated) vertical or horizontal axis movement to a "combined" (diagonal) movement, the intimate juxtaposition of the several control surfaces permits instantaneous switching from isolated to combined movement, or vice versa. This is primarily because the size and shape of the control surfaces, which are proportionally related to the size and shape of the fingertips and thumbs, permit simultaneous finger contact with several surfaces.

f. The control surface has two natural nesting points, referring to the somewhat concave surfaces in which the convex tip of the thumb can naturally rest and stabilize. One of these surfaces is composed of the cylinder and the two adjacent control members behind it, the other is comprised of the cylinder and the two adjacent members in front of it. When a thumb is positioned in either of these resultant concavities as shown in FIG. 3, it is in contact with all the control surfaces: vertical (X), horizontal (Y), and trigger (Z).

g. In a typical point-and-select operation, the user first moves X and Y axes either separately or in concert (point), and them immediately actuates the Z axis (select). In such an operation, it is essential that the "select" function be isolated from the "point" function so as to eliminate the possibility of "cursor creep," in which X and/or Y controls move slightly off target during the select operation (this is a common failing with conventional integrated controls). With the present invention, the user may perform this two-step operation without changing his finger position. When the finger is contacting all three active surfaces, in either of the two grooves as described above, downward pressure to actuate the Z function locks the cylinder and bar against unwanted movement. Through the fingertip, the cylinder is locked to the moving bar, and the moving bar is locked against the switchbar. The harder the finger presses, the more tightly the parts are locked together. The present control is believed to be the only 3-axis control of its kind which successfully achieves this isol796 single contact point.

FIG. 6 illustrates the deflecting beam-type Z-axis switch mechanism of the invention utilizing a flexible track. Satisfactory operation of the control makes it desirable that downward pressure on active surfaces to close the Z-axis switch be uniform, regardless of where in the aperture the finger presses down, or of control movements while maintaining depression. Earlier versions of the control used a pair of perpendicular arms at the ends of the control to form a simple swinging arm. That method takes far too much space, requires substantial rigidity of the moving parts, and varies the pressure required according to the distance of the pressure point from the fulcrum point. The present invention simplifies the mechanism and reduces its size. The objective of the deflecting beam mechanism is to uniformly transfer, to the switch actuator, downward finger pressure on any control surface appearing in the aperture.

With the illustrated mechanism, closure of switch 3 can be achieved by a given downward pressure on the front or rear switchbar 5, 6, on either side switchbar 7, on the sliding bar 8, or on the cylinder 16. The support track 4 is supported at each end by a pair of short legs 22, at a height which brings the track center into light, nonactuating contact with the top of switch actuator 23. These legs extend from the front to the back of the support track. The ends of the support track are firmly captured under the cover 1B against the top of housing bottom 1A so that no vertical movement of the ends of the support track is possible.

The sliding bar 8 is supported at each end and in the center by bearings 24, which are small button-like projections extending from the bottom of the bar and made of Teflon or other bearing material.

When there is no downward finger pressure against any control surface, the support track 4 remains horizontal and the switch 3 remains open. When a finger presses downward against the left switchbar, the support track begins to deflect. The left support track end leg acts as a fulcrum; as the support deflects in the center as shown by the "LOAD" designation in FIG. 7, the downward movement on the switchbar is transferred to the switch actuator 23 and closes the switch. An equivalent action occurs if the right switchbar is depressed; the right support leg then acts as the fulcrum. Downward pressure on either the front or rear switchbar has the same effect; in this case torsional effects are offset by the longitudinal rigidity of the support track, and by the fact that the ends of the track are firmly fixed. The actuation range is seen in FIG. 2 which extends from one switchbar 7 to the other switchbar 7.

All downward pressure on the cylinder is transferred through the cylinder end bushing to the ends of the sliding bar and the end sliding bar bushings 24, onto the support track. When the sliding bar is positioned farthest left, the left sliding bar bushing reaches the left fulcrum point of the support track and thus loses all lever action; all downward movement is then transferred through the right sliding bar bushing onto the support track. When the sliding bar is positioned to the far right, the opposite takes place. In this action, the support track is acting like a pair of lever arms joined in the center. As the sliding bar moves, one lever shortens as the other lengthens, thus balancing out the force required for switch closure. Downward pressure on the sliding bar itself is transferred by the sliding bar bushings closest to the pressure point. In this action, the support track acts more like a pure deflecting beam, bending in response to pressure from several bushings.

In summary, the combined operation of the support track operating partly as a deflecting beam and partly as a pair of lever arms, and the distributed support of the sliding bar bearings acting on that beam, ensure that the finger pressure required to actuate the snap-action switch 3, or other Z-axis force and direction sensing third motion detector, will be uniform, regardless of what point is depressed on any of the active control surfaces, and regardless of the amount and direction of movement of the sliding bar during switch actuation. The deflectable track also may be deflected, i.e. perpendicularly moved, by a sending arm or spring press construction, or by vertical sliding posts.

FIG. 8 illustrates a modified form of a sliding rotary drive coupling in which cylinder 16 contains a rectangular recess 30 and an end cap 31 having a hollow bushing shaft 32 extending therefrom. A drive shaft 33, shown also separately, has a bent end 34 which mates and keys itself into the rectangular recess 30, such that rotation of the cylinder rotates the shaft 33 but wherein the cylinder is free to move longitudinally with respect to the bent end 34 of shaft 33. The opposite end 35 of the shaft 33 is connected to an encoder 21 through a coupling 20 as seen in FIG. 2.

FIGS. 9 and 10 illustrate a further embodiment of the invention in which a barrier bar C' provides a physical barrier between the space bar and the control. The control is mounted on a shelf 38 extending from the keyboard structure. A single sliding bar B' and fixed deflectable U-shaped support track D' is employed, with the cylinder A' being journalled in bar B'.

Grooves are formed in facing surfaces of bar B' and support track D' from which the cylinder A' is spaced. The moving bar B' permits, in computer applications, a pure horizontal cursor movement and mouse click. Cylinder A' permits vertical and horizontal cursor movement, i.e. rotation, left and right longitudinal movement and mouse click, e.g. actuation of switch 23. Switch bar D' permits only mouse click, being isolated from the other rotatively and longitudinal moving components A', B'.

In addition, FIGS. 9 and 10 illustrate a second and third momentary-contact button arrangement, to provide two additional switch closures within the basic module. The most obvious application for this version is in use as a three-button computer mouse. Additional momentary-contact switches G are mounted either in the module or behind it.

In the FIG. 10 end view, leftward thumb pressure on button E' closes switch G. The front of buttons E' and F' appear in openings in the front of the switchbar D', positioned within easy reach of the user's thumbs. The FIG. 9 view of the three-button embodiment illustrates buttons E' and F'. The two arrows indicate direction of travel for actuation. As in the one-button model, the primary switch 3 is still closed by downward pressure on the switchbar D', bar B', or cylinder A'. This configuration distinguishes switch 3 actuation from buttons E', F' by requiring ninety degrees of angular difference in the stroke. Chording (the simultaneous depressing of two or more buttons) is facilitated in this embodiment. The angular difference reduces the likelihood of unintentional closure of buttons E' or F' during normal operations of switch 3.

FIGS. 11 and 12 show a still further embodiment where the single sliding bar B' of FIG. 9 comprises two separate bars $B'_1$ and $B'_2$, straddling the cylinder. A second horizontally moving bar $B'2$ is located in front of the cylinder. Bar $B'_2$ is connected to bar $B'_1$ so that the two bars move in tandem. In practice, the two bars may be two sides of a single part. The purpose of the second bar is to provide the equivalent type of interface as the first bar. The arrangement improves the vertical symmetry of the control by providing a similar cylinder/bar intersection at each side of the cylinder. When the thumb is resting in the switchbar concavity D, it is able to simultaneously contact $B'_2$ and A'. The user is then able to instantly choose pure horizontal control movement (by sliding $B'_2$) or integrated vertical-horizontal movement (by moving A').

It is well established in the art to apply signals to a specialized machine control to produce physical feedback effects for various reasons. This is exemplified by an aircraft flight simulator, in which an airplane cockpit is duplicated on the ground for the training of pilots. In such a simulator, certain controls are fitted with both position sensors and motors. With such interactive controls, conversion between motion and signals is two-way; that is, movement of the control will produce a related signal which is interpreted by the controlled device, and a signal from the controlled device will produce a corresponding motion or modification of motion of the control itself. A common objective is to simulate a direct mechanical link between the control and the controlled device, and the transmission of two-way physical movement through that link.

The main control stick in the flight simulator employs this two-way ability to simulate common flight conditions. In simulated flight, when a student exerts certain control movements on the stick, a specific feedback signal is transmitted from the master controller to servomotors attached to the control stick, resulting in a perception of resistance to the control movement by the student. This perceived resistance is comparable to that encountered in real flight. Similarly, when the student wishes to descend to the airstrip pictured on his screen, the pushes the stick forward. When the imaginary airplane's wheels contact the ground, a second specific signal is transmitted from the simulator controller to the motors attached to the control stick. This causes a physical jolt to be produced in the control stick, which is very similar to the jolt felt in the stick by the pilot of a real airplane upon contact with the airstrip. These feedback signals of physical sensation to the operator greatly enhance the realism and effectiveness of the simulator.

Controls with servomotor feedback are often employed in remote control applications, providing an operator with an enchanced tactile sense of the action of the controlled mechanism. If the present control were to be used, for instance, to remotely operate a crane, cylinder rotation might govern boom elevation, lateral movement of the control might govern the horizontal arc of boom travel, and downward pressure on the control might control bucket closure. Servomotive feedback would then be employed to send tactile signals to the control which would be proportionally related to limits of boom travel, weight of lifted objects, contact with obstacles, etc. These would be preceived by the operator as physical resistance to control movement, or other appropriate sensations.

Because of their mechanical designs, it has not been feasible to apply servomotive feedback to a trackball or a mouse. The present invention, because of the methods of positively linking transducers to the control parts (in isolation from the operator contact surfaces), overcomes these limitations.

Mechanisms for the combined sensing and production or modification of movement are commonly found in numerous industrial machines; a typical such mechanism is a servomotor with a position encoder mounted on a common shaft. The encoder transmits precise shaft position information to a central controller; the controller in turn sends electrical drive signals to the servomotor to produce or modify shaft movement. The arrangement forms a perfect closed loop, with position signals moving one way and motive signals moving the other way.

The control described in FIG. 2 may be employed without major modification to act as such a two-way control. As seen in FIG. 13, the only addition required is that of a servomotor function to the existing position encoders, and means to conduct motive signals from the controlled machine to the motors. This may be done by the addition of servomotors 40, 41 to the encoder shafts.

FIG. 14 illustrates another application of the control 50 in which the control is incorporated in an oscilloscope to control an X-Y cursor 52 on the scope screen 51 and to control, for example, the time base and gain of the oscilloscope circuit.

FIG. 15 illustrates a second embodiment of the cylinder/shaft connection. A keyway 25' is provided in cylinder 16' into which is inserted an elongated key 26' integral with shaft 18' such that shaft 18' rotates with cylinder 16' but wherein the cylinder can move longitudinally with respect to the fixed keyway and shaft.

The novelty of the present invention rests primarily in its logical unification of multiple functions on a single highly tactile "surface", as a result of the mechanical structure and physical arrangement of the components. Any position-sensing means may be used with the device, as long as they are capable of detecting the rotation and lateral movement of the active parts. Common encoding methods include these:

1. Rotary Position Encoders. These may be optical, contact, magnetic, inductive, or other. They may also be resistive potentiometers.

Y-axis detection: The horizontal bar may ride on a wheel coupled to the shaft of an encoder so that linear bar movement is converted to rotary encoder shaft movement.

X-axis detection: The cylinder transmits its rotation to its supporting shaft, which in turn drives, either directly or through one or more idlers, another rotary encoder.

2. Linear Encoding. The horizontal sensing may be accomplished by linking the moving bar to a linear optical encoder or potentiometer.

3. Direct Optical Encoding. As described in the second related patent application, a line pattern may be inscribed on the inner or outer surface of the cylinder to be directly read by adjacent fixed photocells or other sensors. The horizontal axis is detected by a photodetector under the moving bar, reading the movement of lines on the bottom of the bar. This method may be followed magnetically by the use of a magnetic sensor reading magnetic patterns on the moving parts.

4. Other Encoding Methods. There are a number of other means for motion and direction detection, including acoustical and RF resonance, and magnetostrictive detection.

5. Switch Applications. The invention may be used as a multifunction switch, in which, instead of position encoders, simple one or more position switches are arranged to detect varying degrees and directions of pressure on the active components. This may involve the use of switches which are responsive to multiple levels of pressure, or strain gauges, or some combination of these devices and encoders.

It should be emphasized that different characteristics and functions are expected to be given to the control in special applications not only by the selection of switches and encoders, but by the use of specialized software or firmware as well. By these means, added features can be obtained from the control.

The trackball-type pointer in computer applications of the invention may be given a cursor-key personality for specific applications in which cursor keys are desirable and/or mouse functions are either unnecessary or inapplicable. For example, in mode 1 (mouse), the circuit receives the standard quadrature pulse output and sends it on to the computer's mouse driver circuitry. In mode 2 (cursor keys), a given number of pulses in any direction are converted to ASCII cursor-keystroke output, and sent into the computer's keyboard driver.

Instead of converting steady motion to a proportional output, the device of this invention may convert the combination of limited motion with steadily increasing force into output, as in a force-type joystick. In this version, the cylinder and bar would be ergonomically optimized for limited travel.

While the invention has been explained largely in terms of fingertip use, it is contemplated that the described controls may be operated by users wearing gloves, spacesuits, diving gear and the like when large contact surfaces are provided. Since handicapped persons often lack the use of fingers and/or the skill for fine motor movement, the control may be operated by arms, toes or feet or by a rod controlled by a person. The term "digit-operated" is utilized herein to indicate the above-described multiple means by which the control is operated.

The above description of embodiments of this invention is intend to be illustrative and not limiting. Other embodiments of this invention will be obvious to those skilled in the art in view of the above disclosure.

I claim:

1. A device for generating control signals, comprising:

a support (4) having a recess (28) extending longitudinally along said support;

an elongated bar (8) movable longitudinally in said recess;

an elongated cylindrical element (16) rotatively mounted in said bar so as to move rotatively with respect to the bar and connected to the bar to move with said bar in said recess;

means (15), operable by longitudinal movement of said bar, for producing a first signal;

means (20), operable by rotational movement of said cylindrical element independent of and relative to said bar, for producing a second signal;

first means (41) coupled to said cylindrical element for imparting to said cylindrical element, in response to a given signal applied to said first means, a first selected force; and second means (40) coupled to said movable bar (8) for imparting to said movable bar, in response to a given signal applied to the second means, a second selected force.

2. The device of claim 1 wherein said first selected force comprises a rotary accelerative force.

3. The device of claim 1 wherein said first selected force comprises a rotary decelerative force.

4. The device of claim 1 wherein said first selected force imparts a rotary resistance to movement.

5. The device of claim 1 wherein said second selected force comprises a linear accelerative force.

6. The device of claim 1 wherein said second selected force comprises a linear decelerative force.

7. The device of claim 1 wherein said second selected force comprises a resistance to movement.

8. The control of claim 1 above including transducer means coupled to said support so as to produce a third control signal in response to movement of the cylindrical element and movable bar in a direction approximately perpendicular to the longitudinal movement of said bar in said recess in said support.

9. A device as set forth in claim 1 including:
a first transducer mounted in said support;
a second transducer mounted in said support;
means operable by the application of a third signal to said first transducer (15) to alter the longitudinal movement or position of said elongated moving bar (8) and rotative cylindrical element (16); and
means operable by the application of a fourth signal to said second transducer (21), to alter the rotary movement or position of said rotative cylindrical element (16).

* * * * *

UNITED STATES PATENT AND TRADEMARK OFFICE
CERTIFICATE OF CORRECTION

PATENT NO. : 4,982,618

DATED : January 8, 1991

INVENTOR(S) : Craig F. Culver

It is certified that error appears in the above-identified patent and that said Letters Patent is hereby corrected as shown below:

On the title page item [63] Related U.S. Application Data, line 2, correct "No. 4,823,364" to --No. 4,823,634--.

Signed and Sealed this

Fifth Day of January, 1993

Attest:

DOUGLAS B. COMER

*Attesting Officer*   Acting Commissioner of Patents and Trademarks